Figure 1:
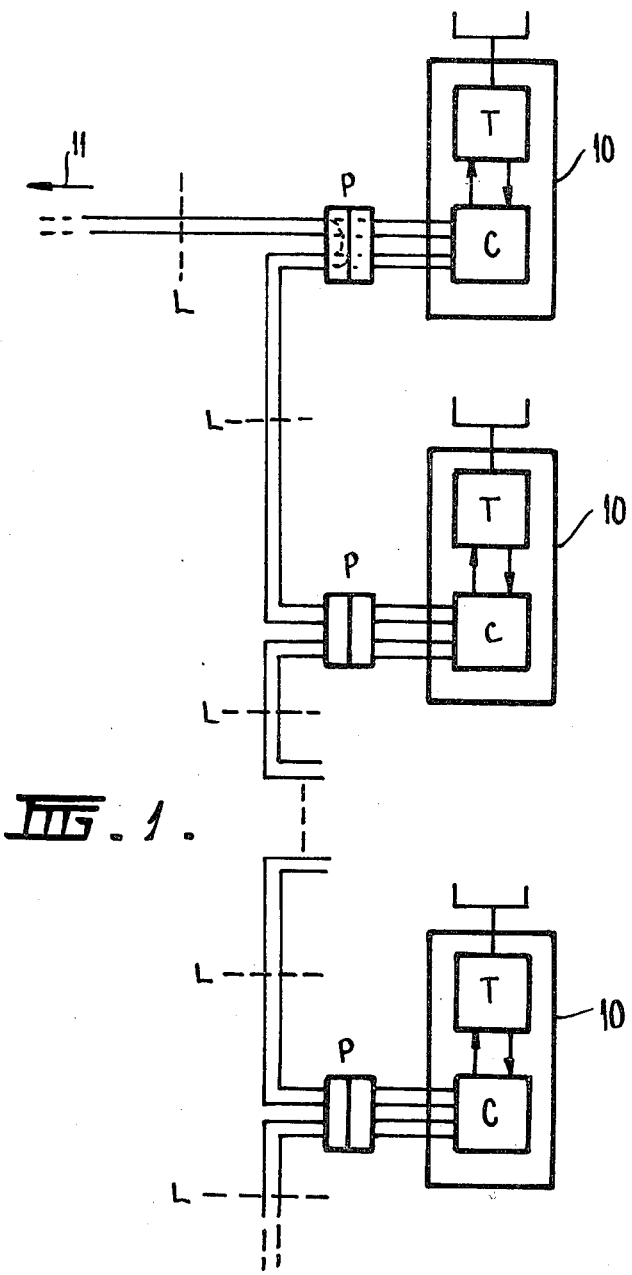

United States Patent [19]

Herschtal

[11] 4,368,358

[45] Jan. 11, 1983

[54] LOOP SHARING IN DIGITAL SYSTEMS

[75] Inventor: Ludwik Herschtal, North Balwyn, Australia

[73] Assignee: L. M. Ericsson Pty. Ltd., Broadmeadows, Australia

[21] Appl. No.: 169,209

[22] Filed: Jul. 15, 1980

[30] Foreign Application Priority Data

Jul. 25, 1979 [AU] Australia ............................. PD9709

[51] Int. Cl.³ .......................................... H04Q 5/02
[52] U.S. Cl. .................................. 179/17 B; 179/2.51
[58] Field of Search ............... 179/17 B, 2.51, 18 AB, 179/19, 27 H, 30, 31, 32, 38, 39, 18 BC, 84 SS; 370/13, 86

[56] References Cited

U.S. PATENT DOCUMENTS

| | | | |
|---|---|---|---|
| 2,994,742 | 8/1961 | Lomax | 179/17 B |
| 3,155,776 | 11/1964 | Kano et al. | 179/32 |
| 3,284,575 | 11/1966 | Howard | 179/31 |
| 3,626,100 | 12/1971 | McNeilly et al. | 370/13 |
| 3,680,053 | 7/1972 | Cotton et al. | 370/86 |
| 3,691,308 | 9/1972 | Angner et al. | 179/84 SS |
| 4,224,478 | 9/1980 | Fahey et al. | 179/18 AB |

Primary Examiner—Gerald L. Brigance
Attorney, Agent, or Firm—Cushman, Darby and Cushman

[57] ABSTRACT

The invention relates to a digital loop sharing telephone system and also to a digital telephone for connection into such a system. The loop may be for a parallel telephone system or a party-line system. Each telephone is adapted to transmit data in an upstream direction on the loop, that is towards an exchange of the system, which data may originate from the telephone itself or a further telephone downstream thereof. Each telephone includes code detector circuitry and logic circuitry whereby if the telephone is the first to change to an off-hook or active condition it "seizes" the loop for exclusive data transmission to the exchange. In the case of a parallel telephone system any telephone going off-hook can receive incoming data from the exchange but only the first telephone to go off-hook can send data. In the case of a party-line system only the telephone which seizes the loop can receive data.

9 Claims, 5 Drawing Figures

FIG_3_

LOOP SHARING IN DIGITAL SYSTEMS

The present invention relates to loop sharing in digital systems. The invention is concerned mainly, but not exclusively, with a digital telephone system wherein a number of digital telephones share a common loop to a concentrator or local exchange.

The term "loop" as used herein is that part of a network used to connect a subscriber terminal or terminals to the nearest switching centre or concentrator. Physically the loop consists of a pair of cables and may be either a two-wire or four-wire transmission arrangement.

Two types of shared loop systems can be identified. The first is a party-line system consisting of several independent subscribers sharing one loop. It is important to offer the party-line subscribers a high degree of privacy. The second type of shared loop system is the parallel instrument arrangement. In this arrangement there is only one subscriber and privacy is of no consequence.

Party-line systems are commonly used in low density rural areas where the loops are very long and expensive. Parallel instruments on the other hand, are often used within a subscriber's premises. Party-line and parallel connections can be used for both telephone and data services. The description below is concerned mainly with telephone services.

Many administrations make use of various subscriber loop sharing systems which are either party-lines or parallel telephones. At present, these are analogue systems and the techniques used are not applicable to forthcoming digital telephones. Furthermore, analogue party-line systems do not offer subscribers adequate privacy as any subscriber can access the loop and enter into an established conversation, merely by going off-hook. Of course it is not possible to have a loop sharing system wherein several digital telephones are directly connected to a common line as in the case of current analogue telephones. The mixing of digital data would produce an unintelligible result.

There are a number of ways of connecting several digital telephones to a common loop. One way would be by means of a multiplexor and demultiplexor which would result in a high data rate on the loop. This method is undesirable due to the higher cost of the multiplexor and demultiplexor and, furthermore, the useable loop length will decrease due to the higher signal loss (attenuation) at the said higher data rate. A second method, applicable when several users wish to participate in a conversation, is in a domestic parallel telephone situation. In this case a special digital processing and summing unit can be used, but again, this is a costly solution. A variant of this would be a system with analogue extension phones with analogue summing in a special unit before conversion of the signal to a digital form. The main disadvantage of this solution is that it is not possible to dial from the analogue extension phones using digital codes. Dialling must then take place from the said special unit which defeats, to a certain extent, the purpose of having parallel phones. The proposed solution, which is the object of this invention is one which connects identical digital telephones to a common loop in a way which overcomes the disadvantages of the previously mentioned solutions. The described method and arrangement provides complete privacy in party-line applications with only one subscriber having access to the loop at any one instant. In a parallel phone situation it is possible to allow a number of users to listen to the incoming speech, but only one of the parallel connected phones can transmit speech. The first of the parallel phones to go off-hook will have access to the loop in the transmit direction. The fact that only one parallel user can talk is considered to be of minor importance.

It is an object of this invention to provide a loop sharing system for digital communication which avoids one or more of the aforementioned disadvantages.

It is a further object of this invention to provide a digital telephone instrument adapted for connection into a digital loop sharing telephone system or into a parallel telephone connection.

Figure 2:
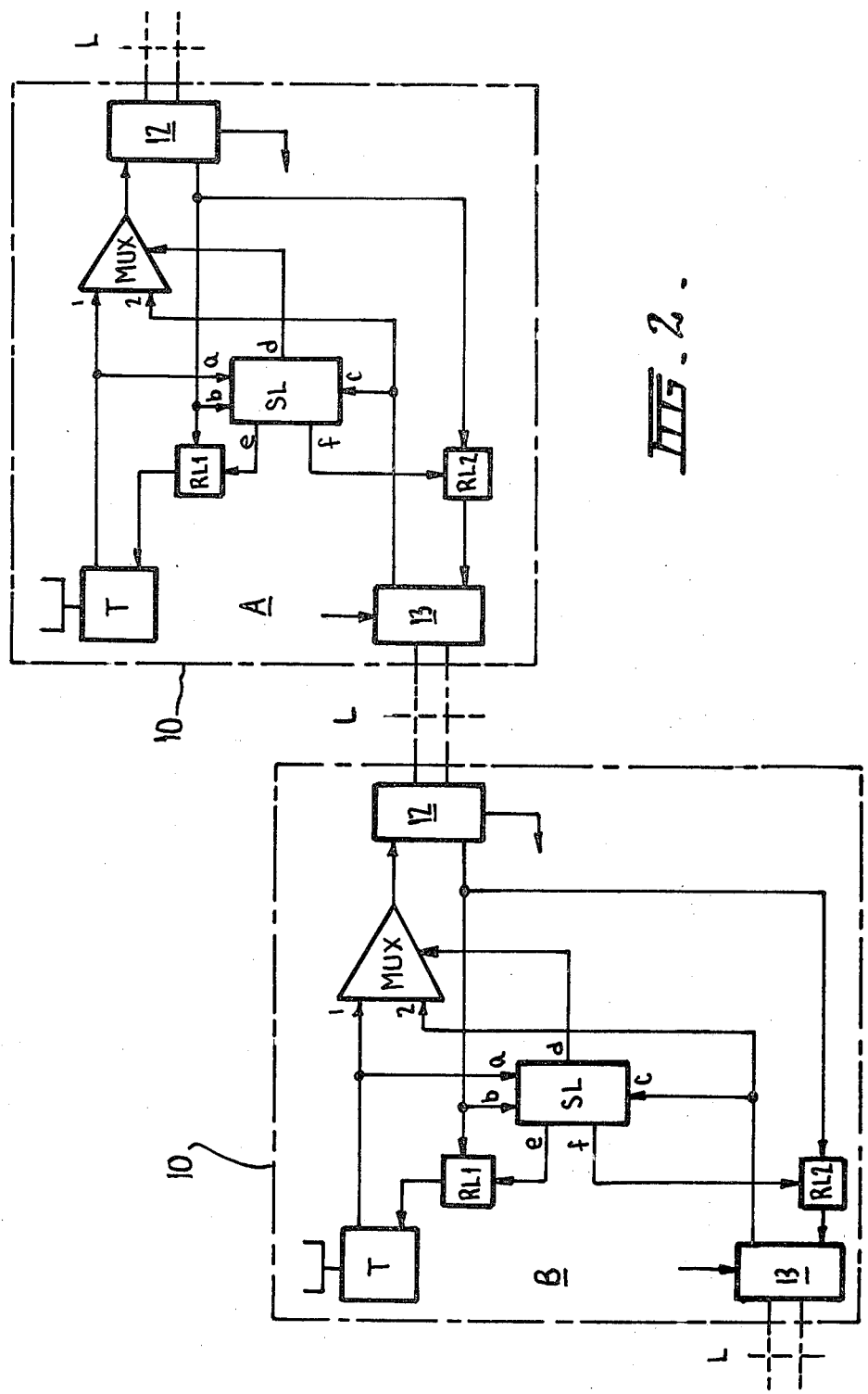
Figure 3:
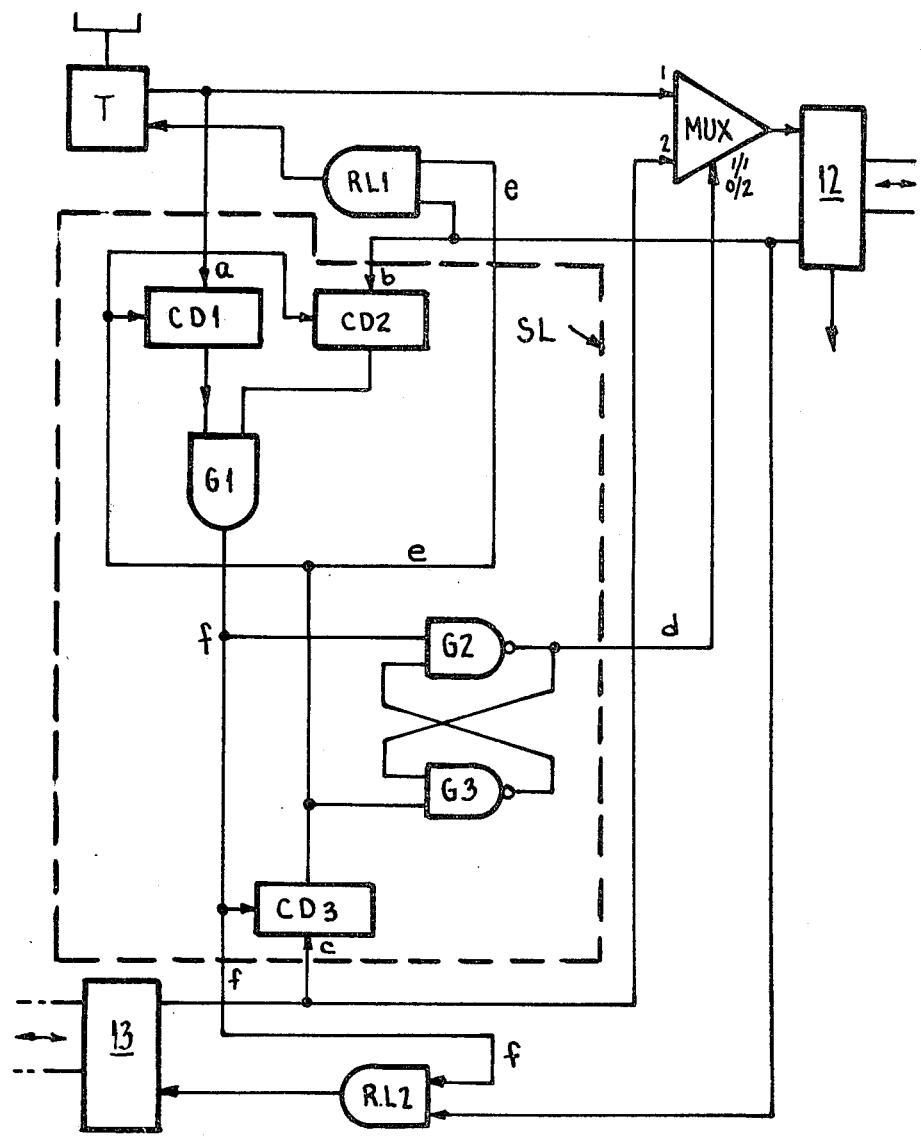
Figure 4:
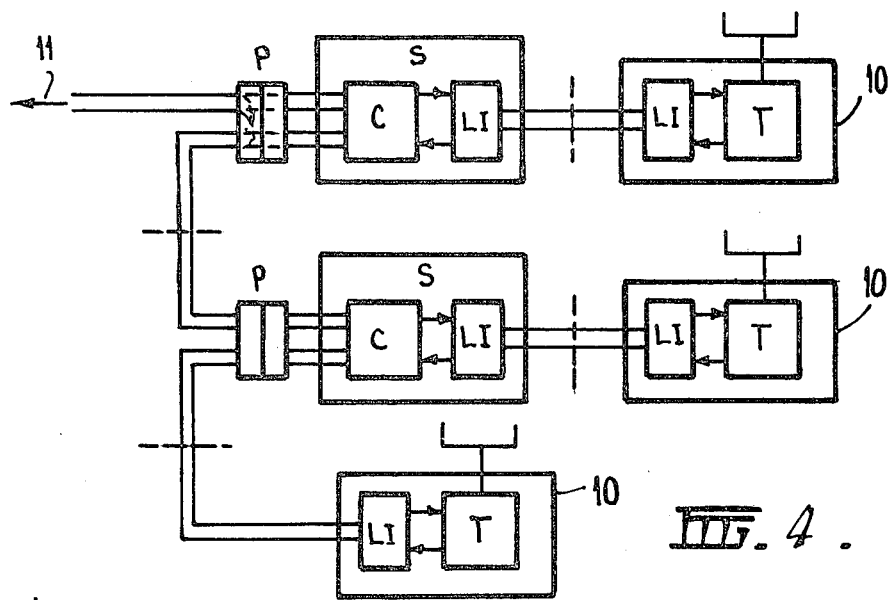
Figure 5:
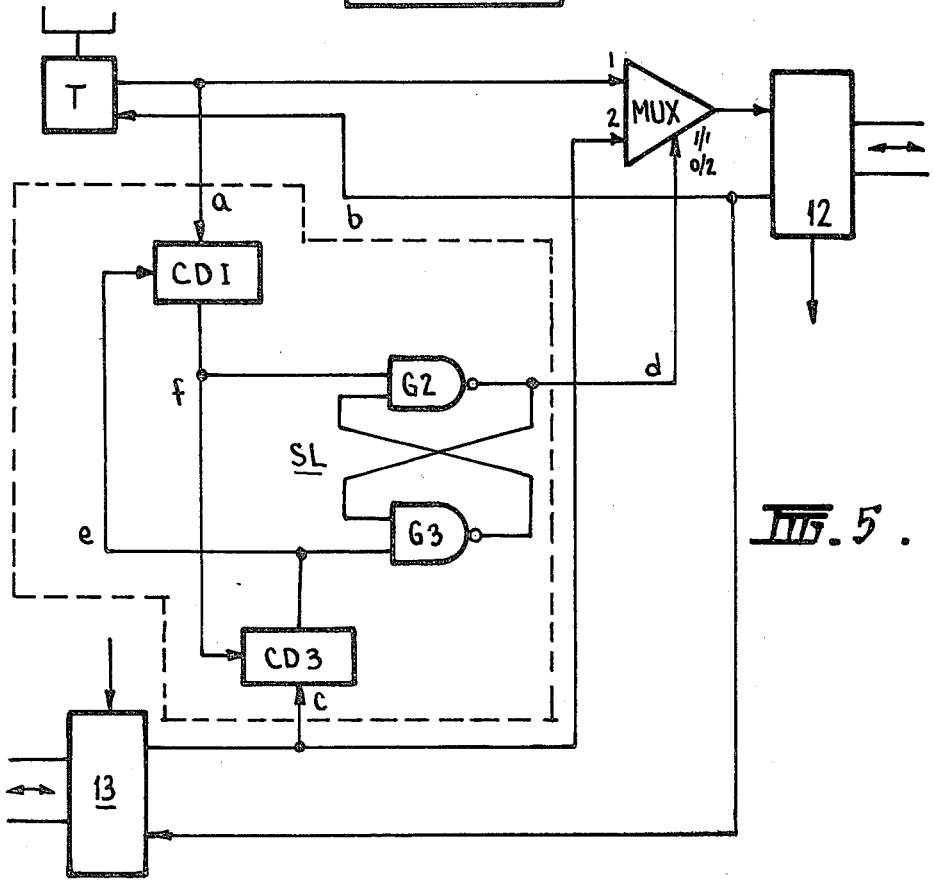

In order that the invention may be more readily understood particular embodiments thereof will now be described with reference to the accompanying drawings wherein:

FIG. 1 is a basic system block diagram showing a number of digital telephones connected to a loop, FIG. 2 is a basic circuit block diagram of two of the telephones shown in FIG. 1, FIG. 3 is a more detailed circuit diagram of a telephone as shown in FIGS. 1 and 2, FIG. 4 shows a further embodiment whereby conventional digital telephones are used in association with respective splitter boxes to connect to a loop connection, and FIG. 5 is a circuit diagram similar to FIG. 3 showing a further embodiment for parallel telephone applications.

Referring now to FIG. 1 there is shown a number of telephone instruments 10 connected to a common loop or party-line referenced as L. The loop L is adapted to connect any one of the telephone instruments 10 with an exchange (not shown) or concentrator (not shown) which is arranged in the direction of arrow 11 shown in FIG. 1. A respective plug P facilitates connection of each telephone instrument 10 to the loop whereby removing of an instrument 10 extends the loop to the next instrument in the chain. This extension is a mechanical extension via the associated plug P.

Each telephone instrument 10 includes a telephone part T and a control circuit and line interface part C. The telephone part T contains the digital telephone components such as codec, filters, code generator and receiver, ring generator, for the conversion of ring code to ring alarm, amplifiers, key set, logic functions and transducers, all of which are not shown in detail in the drawings. The control circuit and line interface part C consists of several circuit blocks as shown in FIG. 2. These circuit blocks include line interface circuits 12 and 13, multiplexor (MUX), steering logic (SL) and receive logic (RL1 and RL2). In order that the telephone instrument 10 may be used as a conventional telephone instrument, that is, in a non-shared loop configuration, the telephone part T is normally connected directly to the line interface circuit 12. This enables the telephone instrument 10 to operate as a conventional telephone.

It should be noted that the loop L may be two wire or four wire and the data transmission may be diphase or bipolar and in either case the line interface circuits 12 and 13 convert the data from the loop L to non-return-to-zero (NRZ) data signals for use internally within the telephone instrument 10. If the loop is two wire the line interface circuits also contain hybrids, filters and buffers depending on the nature of the two wire circuit. Line interface circuit 12 also performs the function of clock extraction from incoming data.

The two input multiplexor (MUX) selects the bit stream for transmission upstream, that is, towards the exchange. The bit stream may come from the "local" telephone instrument 10 or may come from a telephone downstream via the loop L and line interface circuit 13. The steering logic SL controls all the signal selection and determines which telephone is to be connected to the loop L. The steering logic SL also prevents two or more telephones seizing the loop simultaneously in both the send and receive directions. As can be seen from FIG. 3 the steering logic SL contains code detectors CD1 CD2 and CD3. The code detectors CD1 and CD3 detect on hook code via connections (a) and (c) and code detector CD2 is a ring code detector which detects a ring code on connection (b). The steering logic SL also contains gates G1, G2 and G3 the latter two of which form latching logic circuitry. The code detectors include interlocking so that the first detector to produce an "active" output inhibits the other code detectors. Output (d) of SL selects the appropriate bit stream for transmission to the loop in an upstream direction via interface circuit 12 and outputs (e) and (f) direct the received bit stream from the upstream direction either to the local telephone part T or onwardly downstream to the next telephone via receive logic RL2. The code detectors may consist of shift registers, buffers or comparators and the detailed design thereof will depend on the signalling codes in use.

It should be noted that in parallel telephone applications it is possible to simplify the logic by omitting the gates RL1 and RL2 and code detector CD2, all telephones being then able to receive the incoming data from the exchange. All parallel phones will ring on receiving the ring code from the exchange, the ring code being converted to a ring alarm by the ring generator within part T of the telephone. FIG. 5 shows the simplified arrangement.

OPERATION

Assume that all telephone instruments 10 are initially "on-hook" and generate an "on-hook" code and the exchange sends a "quiet tone" in the quiescent state. The operation can be described by considering the following party-line cases:

Case 1

Telephone instrument "A" (FIG. 2) goes "off-hook". Code detector CD1 (FIG. 3) detects the loss of "on-hook" code and its output changes state from logical HIGH to logical LOW.

This signal is applied via AND gate G1 to the latch G2, G3 at (f). Output (d) of G2 goes HIGH and input 1 of MUX is connected to the line interface 12 for transmission on the loop L. The incoming bitstream from the exchange is channelled to T via AND gate RL1 since (e) is HIGH, and inhibited from going down stream by AND gate RL2 since (f) is LOW. Instrument "A" has thus seized the loop as the code detectors are interlocked and no other instrument can interrupt the connection. Note that the "locked out" instruments will all be receiving a constant LOW level in this arrangement. This can be translated into a "Loop Busy" tone within the telephone receivers T. The loops between phones will have transitions due to diphase or bipolar line interface circuits so all instruments can always extract clock from the upstream direction. In the exchange, "A's" identity will be recognized for charging and supervision purposes.

Case 2

Instrument "B" goes "off-hook".

The events within instrument "B" are as described above for case 1. The "send" bitstream from "B" flows via line interface 12 to the loop and thence via line interface 13 into instrument A (FIG. 2) and into SL at (c). The output (e) of CD3 goes LOW and operates the latch G2, G3 (FIG. 3). Output (d) of the latch goes LOW and input 2 of the MUX is selected for transmission upstream. At the same time the incoming bitstream is inhibited from reaching the T part of instrument A by RL1 and (e) whilst it is enabled to flow towards instrument B via gate RL2 and (f). In this way instrument B seizes the loop whilst instrument A and all other instruments on the loop are locked out.

Case 3

Ring code is received from the exchange. Assume the ring code addresses instrument B.

Initially all instruments receive the incoming quiet tone as all RL gates are enabled by (e) and (f) signals. In instrument B, the ring code will operate code detector CD2 which will go to a logical LOW level. This signal is applied to the latch G2, G3 at (f) and instrument B blocks all instruments downstream of itself. If B answers (goes off-hook) it will seize the loop as in Case 2 above. If, however, the upstream instrument A goes "off-hook" before B answers, the exchange will receive A's identity code instead of B's identity code. The exchange will then proceed to disconnect B's call and set up A's call.

It is possible that certain faults such as broken loops (between instruments) power failure and certain component faults such as open and short circuits may result in a latch up of the loop. Steps can be taken to prevent faults from spreading upstream by designing the code detectors CD1 and CD3 so that they produce a HIGH output when their inputs (a or c) are continuously HIGH or continuously LOW.

If the instruments are powered from local power, it may be desirable to power the SL, RL, MUX and line interfaces from the exchange line so that local power failure will not disable other instruments on the loop.

FIG. 4 shows an alternative scheme for sharing digital loops. The advantage of this arrangement is that the telephone can be standard (same as for dedicated loops). A splitter box S will, however, have to be supplied as a separate unit for shared loop applications. The splitter box S contains the control circuitry C which formed part of the telephone instrument 10 of the previous embodiment. There is totally more hardware in this implementation due to the additional line interface circuits LI required between the control circuit C and telephone part T.

It should be evident from the description herein that the present invention provides a digital loop sharing system for party-line or parallel telephone applications which overcomes the difficulties associated with paralleling instruments which generate a digital bitstream at their output. Furthermore the invention provides an improved digital telephone instrument facilitating connection to a digital loop sharing telephone system between different subscribers or to a digital equivalent of a domestic parallel telephone installation.

I claim:

1. A telephone instrument for transmission and reception of digital data, said instrument being adapted for connection into a digital loop sharing telephone system to transmit digital data to and receive digital data from an exchange in the upstream direction through other telephone instruments connected to said loop in said upstream direction, said telephone instrument comprising:
- code detector means for detecting a change to an "off-hook" or data sending state in said instrument and for detecting a change to an "off-hook" or data sending state in a similar telephone instrument downstream of said telephone instrument; and
- logic circuitry connected to said code detector means, said logic circuitry being responsive to the change detected by said code detector means to latch said telephone instrument to enable data originating from said telephone instrument or data from a telephone instrument downstream thereof to be transmitted only in said upstream direction of said loop depending, respectively, upon whether said telephone instrument or said downstream telephone instrument first changes to an "off-hook" state, only one of said telephone instruments being able to communicate with said upstream exchange after an "off-hook" state is detected.

2. A telephone instrument as defined in claim 1 further including an "on-hook" code generating means for generating a preselected digital code indicative of an "on-hook" state when said instrument is not in use, the output of said "on-hook" code generating means being operatively connected to said code detector means wherein the absence of said "on-hook" code being detected by said code detector means to represent an "off-hook" state.

3. A telephone instrument as defined in claim 2 adapted for a multiple receiving telephone system including a codex circuit for receiving at all times when said telephone instrument is in said "off-hook" state, data transmitted to said instrument from said upstream direction wherein all telephones of said multiple receiving telephone system are simultaneously capable of receiving data from said upstream exchange.

4. The telephone instrument of claim 1, 2 or 3 further comprising a two-input multiplexor controlled by said logic circuitry to switch the appropriate data for transmission in said upstream direction.

5. A telephone instrument as defined in claim 1 or 2 and adapted for a party-line telephone system, said instrument further including code detector means for detecting a digital calling code identifying said instrument from said exchange and for causing upon detection of said calling code operation of a first gate circuit connected thereto for isolating transmission of digital data with respect to said downstream direction, and second gate circuit means for inhibiting reception of data by the telephone portion of said instrument when data received at said telephone instrument from said upstream direction is for transmission to telephone instruments downstream thereof.

6. A telephone system as defined in claim 5 further including a two-input multiplexor connected to said logic circuitry for switching the appropriate data for transmission in said upstream direction.

7. A loop sharing digital communication system having a common loop connection adapted for connecting a plurality of communication devices to an exchange in the upstream direction, each of said communication devices being adapted for transmission and reception of digital data to or from said exchange through said loop, the connection of each device in said loop being arranged such that data to or from a particular communication device is transmitted via each other communication device in an upstream direction therefrom, said upstream direction being toward the exchange of said system, each communication device comprising:
- code detector means for detecting when said device or a further device downstream therefrom has changed from a quiescent state to an active or data sending state; and
- logic circuitry connected to said code detector means, said logic circuitry being responsive to the output of said code detector means for enabling data from said communication device or from a communication device downstream therefrom to be transmitted to said loop in said upstream direction wherein the first communication device to change to said active state seizes said loop for exclusive data transmission to said exchange.

8. The system according to claim 7 wherein said communication device is a digital telephone instrument.

9. A system according to claim 7 or 8 wherein said system is a multiple receiving telephone system and wherein each telephone is adapted to receive data from said exchange during a connection in which one of said telephones seizes said loop for exclusive data transmission.

* * * * *